United States Patent
Jordan

(10) Patent No.: US 12,080,839 B2
(45) Date of Patent: Sep. 3, 2024

(54) APPARATUS FOR PRODUCING AN ELECTRODE STACK

(71) Applicant: VOLKSWAGEN AG, Wolfsburg (DE)

(72) Inventor: Marco Jordan, Salzgitter (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 552 days.

(21) Appl. No.: 17/413,382

(22) PCT Filed: Nov. 25, 2019

(86) PCT No.: PCT/EP2019/082347
§ 371 (c)(1),
(2) Date: Jun. 11, 2021

(87) PCT Pub. No.: WO2020/120109
PCT Pub. Date: Jun. 18, 2020

(65) Prior Publication Data
US 2022/0102747 A1 Mar. 31, 2022

(30) Foreign Application Priority Data
Dec. 12, 2018 (DE) .................. 10 2018 221 571.5

(51) Int. Cl.
*H01M 10/04* (2006.01)
*H01M 10/0525* (2010.01)
*H01M 10/0585* (2010.01)

(52) U.S. Cl.
CPC ... *H01M 10/0404* (2013.01); *H01M 10/0585* (2013.01); *H01M 10/0525* (2013.01); *H01M 2220/20* (2013.01)

(58) Field of Classification Search
CPC ......... H01M 10/0404; H01M 10/0525; H01M 10/0585; H01M 2220/20; Y02E 60/10; Y02P 70/50
See application file for complete search history.

(56) References Cited

U.S. PATENT DOCUMENTS 9,461,330 B2    10/2016  Watanabe et al.
9,899,698 B2 *   2/2018  Ku .................... H01M 10/0431
(Continued)

FOREIGN PATENT DOCUMENTS

CN      103460490 A        12/2013
DE  10 2010 055 608 A1    6/2012
(Continued)

OTHER PUBLICATIONS

Search report for German Patent Application No. 10 2018 221 571.5, mailed Oct. 16, 2019.
(Continued)

*Primary Examiner* — Minh N Trinh
(74) *Attorney, Agent, or Firm* — PEARL COHEN ZEDEK LATZER BARATZ LLP

(57) ABSTRACT

The invention relates to a method for producing an electrode stack from anodes (4) and cathodes (6) for a lithium-ion battery, in particular of an electrically driven motor vehicle, in which the cathodes (6) are provided in a first magazine (8) and are transported without grippers only in a first direction (R1) from the first magazine (8) into a chamber (12), in which the anodes (4) are provided in a second magazine (10) and are transported without grippers only in a second direction (R2) from the second magazine (10) into a chamber (12), wherein the cathodes (6) and anodes (4) are stacked alternately in the chamber (12), and in which the alternately stacked cathodes (6) and anodes (4) are aligned with one another, and pressed against one another, in the chamber (Continued)

(12). The invention also relates to an apparatus (16) for producing such an electrode stack (2).

6 Claims, 4 Drawing Sheets

(56) References Cited

U.S. PATENT DOCUMENTS

| | | | |
|---|---|---|---|
| 2009/0011338 A1 | 1/2009 | Kimura | |
| 2013/0164607 A1* | 6/2013 | Shih | H01M 10/052 29/730 |
| 2013/0252069 A1* | 9/2013 | Min | H01M 10/00 29/730 |
| 2019/0036149 A1 | 1/2019 | Sakurai et al. | |
| 2022/0102747 A1* | 3/2022 | Jordan | H01M 10/0404 |

FOREIGN PATENT DOCUMENTS

| | | |
|---|---|---|
| DE | 10 2010 055611 A1 | 6/2012 |
| DE | 10 2012 000616 A1 | 10/2012 |
| DE | 11 2007 002 732 B4 | 9/2016 |
| DE | 102019204868 B3 * | 10/2020 |
| JP | 5 778124 B2 | 9/2015 |
| JP | 2017-76489 A | 4/2017 |
| JP | 2018-006216 A | 1/2018 |
| KR | 20-1998-0006764 U | 4/1998 |
| KR | 101 280 068 B1 | 6/2013 |
| WO | WO 2017/073677 A1 | 5/2017 |
| WO | WO 2017/131027 A1 | 8/2017 |

OTHER PUBLICATIONS

International Search Report of PCT Application No. PCT/EP2019/082347, mailed Jan. 16, 2020.
Search Report for application No. KR 10-2021-7021323, dated Feb. 2, 2024.
Search Report for Chinese Patent Application No. 201980081526.8, dated Apr. 19, 2024.

* cited by examiner

APPARATUS FOR PRODUCING AN ELECTRODE STACK

CROSS-REFERENCE TO RELATED APPLICATIONS

This application is a National Phase Application of PCT International Application No. PCT/EP2019/082347, International Filing Date Nov. 25, 2019, claiming priority of German Patent Application No. 10 2018 221 571.5, filed Dec. 12, 2018, which is hereby incorporated by reference.

FIELD OF THE INVENTION

The invention relates to a method as well as to an apparatus for producing an electrode stack consisting of anodes and cathodes for a lithium-ion battery.

BACKGROUND OF THE INVENTION

Such a lithium-ion battery comprises at least one battery cell which holds an electrode stack having a plurality of sheet-like cathodes (cathode sheets, cathode foils) and sheet-like anodes (anode sheets, anode foils), whereby the cathodes and the anodes are, for example, stacked on top of each other, and whereby a separator is arranged between each of the cathodes and the anodes.

The electrode stack with the anodes and cathodes stacked on top of each other is produced, for instance, by means of so-called individual-sheet stacking or by means of so-called Z-folding. In this process, the individual anodes and cathodes are typically moved by means of a gripper system (gripping system). A gripper of this gripper system picks up the electrode in question, in other words, the appertaining anode or cathode, conveys it to a stacking site while holding it, and then deposits the electrode there. Such gripper systems, however, are relatively slow. As a result, it is a drawback that the production process of such an electrode stack is relatively time-consuming.

SUMMARY OF THE INVENTION

The invention is based on the objective of putting forward a highly suitable method as well as an apparatus for producing an electrode stack for a lithium-ion battery. In particular, the method and/or the apparatus should yield a production of the electrode stack that is as time-saving, cost-cutting and/or damage-resistant as possible.

Regarding the method, the above-mentioned objective is achieved according to the invention by the features of claim 1 and, regarding the apparatus, this is achieved by the features of claim 4. Advantageous refinements and embodiments are the subject matter of the subordinate claims.

When it comes to the method for producing an electrode stack consisting of anodes and cathodes for a lithium-ion battery (Li-ion battery), for example, of an electrically powered motor vehicle, the cathodes are placed in a first magazine and the anodes in a second magazine. The cathodes are conveyed exclusively in a first direction from the first magazine into a chamber without using a gripper. The anodes are conveyed exclusively in a second direction from the second magazine into the chamber without using a gripper. In this process, the cathodes and the anodes are conveyed into the chamber alternatingly and thus stacked in an alternating manner. Advantageously, in order to convey the anodes and the cathodes, a conveying device is employed which, for example, has a conveying roller that is driven exclusively so as to rotate.

The anodes and the cathodes are also referred to together as electrodes. They are especially configured so as to be in sheet form. In other words, the electrodes have a relatively small extension in one spatial direction, that is to say, they are configured so as to be flat. The electrodes are also referred to as electrode sheets, and accordingly, the anodes and cathodes are referred to as anode sheets and cathode sheets, respectively. A separator is advantageously arranged on each of the (surface) sides, in other words, on the flat sides of the provided cathodes. In particular, the cathode is laminated on both sides with a separator (separator foil). As a result, a separator is arranged between each of the anodes and cathodes in the electrode stack. Each electrode advantageously also has an electrical contact—also referred to as a tab—that is formed by a current conductor of the appertaining electrode. In this context, the section of the current conductor that forms the contact projects beyond an end face of the electrode.

The assembly consisting of the separator foil and the cathode, that is to say, the laminated cathode, especially preferably has the same dimensions as the anodes, if applicable, except in the area of the electrical contact. In other words, the extension of the assembly consisting of the separator foil and the cathode in a plane spanned by the appertaining cathode matches the extension of the anodes in a plane spanned by the appertaining anode. Below, for the sake of greater clarity, the term "cathode" is to be understood as the assembly consisting of the separator foil and the cathode, in other words, the laminated cathode. These elaborations regarding the electrodes also apply in conjunction with the elaborations regarding the apparatus for producing an electrode stack.

In a subsequent step, the alternatingly stacked cathodes and anodes are aligned in the chamber so to be flush, especially by means of rams, and are then pressed against each other, especially using a compression unit. In particular, the anodes and the cathodes are aligned so as to be flush with each other along their entire circumference, except in the area of the contacts of the anodes or of the cathodes.

In the case of the above-mentioned gripper systems, the electrodes (electrode sheets) are taken out of the appertaining magazine and, in this process, they are typically lifted, conveyed, and subsequently deposited, for example, in a chamber. Each individual electrode is held by the gripper in this process. Here, the gripper of the gripper system that is holding the electrode is moved along accordingly while the electrode is being conveyed. In this context, the directions in which the electrode is moved differ during the movement, the placement and the removal. In other words, the grippers are moved in more than one single direction while they are holding the anodes or the cathodes. In comparison to such gripper systems, here, the cathodes and anodes are conveyed into the chamber without a gripper, that is to say, without the use of a gripper system. The electrodes are conveyed exclusively in one single direction from the magazine into the chamber. In particular, the electrodes are not being held in this process and/or the (conveyor) device that conveys the electrodes is not being moved. In particular, the electrodes are imparted with a pulse, for example, by being pushed or driven, exclusively in the first direction or in the second direction by means of the conveying device, so that the electrodes are moved into the chamber due to their inertia. Advantageously, such a conveying method is relatively fast. As a result, the entire method for producing the electrode stack is likewise faster. Therefore, the processing rate of the production of the electrode stack is advantageously increased, in other words, the throughput rate is boosted.

In this context, the first direction and the second direction are each designated as the conveying direction. For example, the first direction and/or the second direction are defined by means of a guiderail.

According to a suitable refinement, the first direction and the second direction run in a shared plane, whereby the plane is oriented perpendicular to the bottom of the chamber. Here, the first direction and the second direction are preferably oriented antiparallel relative to each other, or else essentially antiparallel and only slightly inclined, for example, by less than 30°, especially by less than 20°, relative to the bottom of the chamber. In this manner, the cathodes and the anodes are placed into the chamber from opposite sides. In this context, the inclination of the first and/or second direction facilitates the transfer of the appertaining electrode into the chamber.

Insofar as the electrodes are guided by means of a guiderail, the electrodes are preferably conveyed in such a way that the end face towards which the electrical contact protrudes is oriented perpendicular to the conveying direction, in other words, perpendicular to the guiderails. This prevents the electrical contacts from being damaged by the guiderails while they are being conveyed. The electrical contacts of the anodes and of the cathodes are arranged in the electrode stack, for instance, on a shared end face of the electrode stack or on opposite and parallel sides of the electrode stack. As a result, the first (conveying) direction and the second (conveying) direction advantageously run essentially antiparallel and in a shared plane that is oriented perpendicular to the bottom of the chamber.

According to a suitable refinement, the cathodes conveyed into the chamber and the anodes conveyed into the chamber are pressed against the bottom of the chamber by means of an air stream. As a result, the sinking rate of the cathodes and anodes is increased, so that the production rate of the electrode stack by means of the method is comparatively high.

The apparatus is designed and suitable for producing an electrode stack consisting of anodes and cathodes for a lithium-ion battery, for example, for a (traction) battery of an electrically powered motor vehicle. For this purpose, the apparatus has a chamber, also referred to as a manufacturing cylinder, that serves to accommodate the anodes and the cathodes. Moreover, the apparatus has a conveying device without a gripper for purposes of transferring the anodes and the cathodes from their respective magazines into the chamber, especially exclusively in the first conveying direction or exclusively in the second conveying direction. In other words, the conveying device does not have any grippers to hold the anodes and the cathodes while they are being transferred into the chamber.

The apparatus has at least two rams arranged in the chamber and they can be moved parallel to the chamber bottom and perpendicular to each other so that the anodes and the cathodes that are held in the chamber can be aligned so as to be flush with each other. When the rams are moved (adjusted), the end faces of the anodes and cathodes that adjoin the appertaining ram are aligned so as to be flush with each other. In other words, the end faces of the cathodes and anodes are parallel to each other and to the appertaining ram.

Furthermore, the apparatus has a compression unit that can be moved perpendicular to the chamber bottom. This unit serves to generate a pressing force onto the anodes and the cathodes that have advantageously been stacked alternatingly in the chamber and aligned so as to be flush with each other.

Owing to the flush alignment of the anodes and cathodes by means of the ram, the anodes and cathodes can be flawlessly aligned relative to each other.

According to a suitable refinement, the conveying device has a conveying roller that is driven exclusively so as to rotate in order to transfer the anodes and the cathodes. In other words, the roller element cannot be moved translationally, but rather, it is locally stationary, whereby the roller element is driven so as to rotate in order to transfer the anodes and cathodes. The roller element is especially configured as a cylinder, a wheel or a roller. For example, the roller element has a roughened surface so that the appertaining electrode is conveyed due to friction between the rotating roller element and the electrode. In other words, to sum it up, the apparatus does not have a gripper. Consequently, analogously to the method presented above, an apparatus is put forward by means of which the production of the electrode stack saves time in comparison to the apparatuses having the above-mentioned gripper systems.

For instance, the conveying device additionally comprises guiderails with which the anodes or cathodes being conveyed by means of the conveying device are placed into the chamber.

For example, when the anodes and cathodes are being aligned so as to be flush with each other, the rams are each moved towards a stationary contact surface, especially to a chamber wall, whereby this contact surface aligns the end faces of the cathodes and anodes that adjoin this contact surface. According to an advantageous embodiment of the apparatus, however, four rams are arranged in the chamber, whereby two of the rams can be (adjustably) moved in and counter to a first direction of movement, whereas the other two rams can be moved in and counter to a second direction of movement that is perpendicular to the first direction. Thus, each of the end faces of the anodes and cathodes is aligned by means of the appertaining ram. Advantageously, the first direction of movement or the second direction of movement lies in the same plane in which the conveying directions run. After the anodes and the cathodes have been pressed against each other, the rams can be moved away from the electrode stack. This makes it simpler to remove the electrode stack from the chamber.

The compression unit can advantageously be moved into the chamber and especially between the rams that align the anodes and the cathodes.

According to an advantageous refinement, the compression unit has an air nozzle on its side facing the bottom of the chamber. Preferably, the compression unit has several air nozzles on the side facing the chamber bottom. These nozzles serve to generate an air stream that is directed towards the bottom of the chamber. The anodes and the cathodes that had been conveyed into the chamber are pressed against the bottom of the chamber by the air stream, as a result of which the sinking rate of the anodes and cathodes is increased. Consequently, the production rate of the electrode stack is advantageously increased.

According to an advantageous embodiment, at least one of the rams has a recess to accommodate the electrical contacts of the cathodes and/or of the anodes during the alignment procedure. In other words, the ram having the recess flanks the appertaining electrical contacts. Depending on the configuration, especially depending on the arrangement, of the electrical contacts of the anodes and cathodes, one of the rams has a recess for the electrical contacts of the anodes as well as of the cathodes. Alternatively, one of the rams has two recesses at a distance from each other, whereby one of the recesses is provided for the electrical contacts of the anodes while the other recess is provided for the electrical contacts of the cathodes. Likewise as an alternative, two rams, which especially are opposite from each other, each have a recess, whereby one of the recesses is provided for the electrical contacts of the anodes while the other recess is provided for the electrical contacts of the cathodes.

According to a suitable embodiment, the roller element can generate a negative pressure. The negative pressure individuates one electrode from the electrodes stored in the appertaining magazine and accelerates it in the appertaining conveying direction, in other words, the electrode is imparted with a pulse. For this purpose, for instance, one air channel or several air channels that is/are coupled to an air exhaust pump is/are arranged in the roller element. In summary, the appertaining conveying roller not only individuates the cathodes and the anodes that are held in the magazine but also conveys them into the chamber.

According to an advantageous refinement of the apparatus, the chamber bottom is formed by a conveyor belt, especially one whose height is adjustable. After the anodes and cathodes have been pressed against each other so as to form an electrode stack, the electrode stack can be easily moved away from the rams by lowering the chamber bottom. For example, the compression unit is lowered together with the chamber bottom in this process. In particular, the electrode stack is discharged from the chamber in a manner that is relatively safe against damage, for example, due to the electrode stack getting caught on one of the rams or on one of the stationary contact surfaces. For instance, the electrode stack is subsequently stored or else made available for further assembly of a lithium-ion battery.

BRIEF DESCRIPTION OF THE DRAWINGS

An embodiment of the invention will be explained in greater detail below with reference to a drawing. The following is shown there.

DETAILED DESCRIPTION OF THE INVENTION

Figure 1:
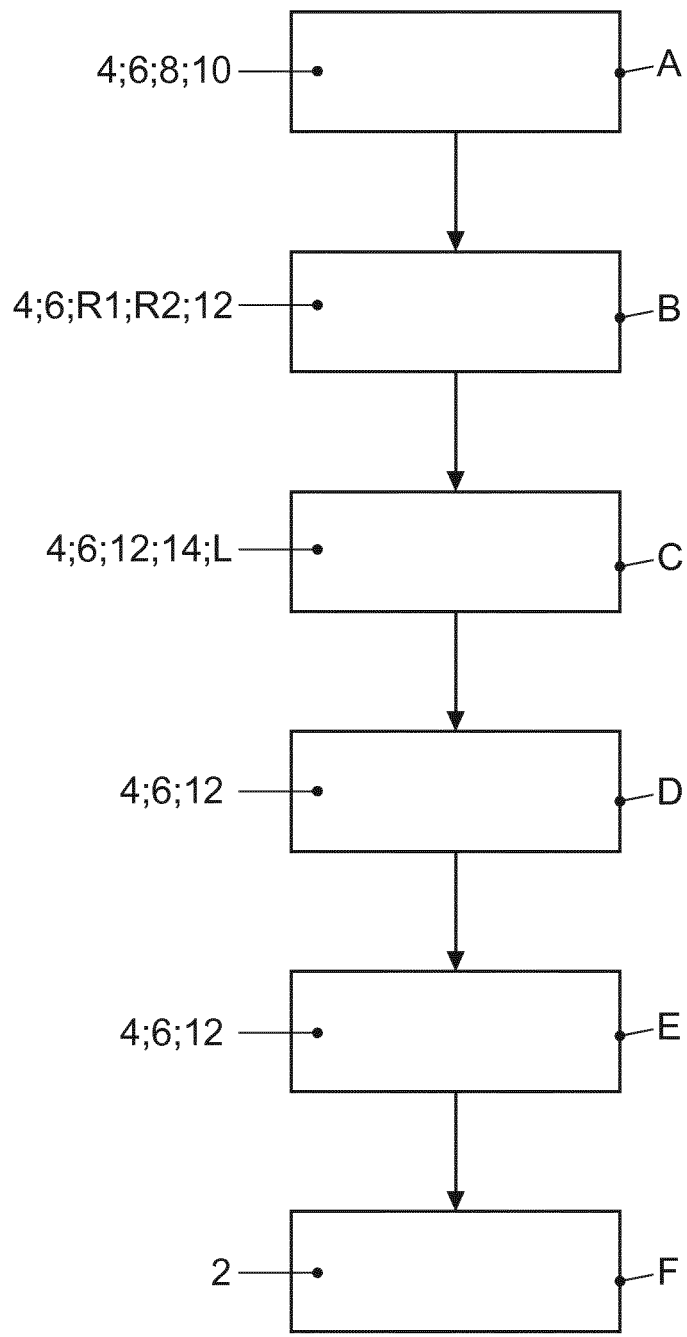
FIG. 1 is a flowchart depicting a method for producing an electrode stack, whereby prepared anodes and prepared cathodes are conveyed into a chamber without the use of grippers.

Parts and dimensions that correspond with each other are always designated in the figures with the same reference numerals.

The flowchart shown in FIG. 1 depicts a method for producing an electrode stack 2 consisting of anodes 4 and cathodes 6. The electrode stack 2 here is intended for a lithium-ion battery (not shown in greater detail here), for instance, for a (traction) battery of a motor vehicle.

In a first step A, the sheet-like cathodes 6 are provided in a first magazine 8 while the sheet-like anodes 4 are provided in a second magazine 10. The anodes 4 and the cathodes 6 are referred to altogether as electrodes. In this context, the cathodes 6 are laminated on both sides with a separator (separator foil), whereby the assembly consisting of the separator foil and the cathode 6, in other words, the laminated cathode 6, has the same dimensions as the anodes 4. As a result, a separator is arranged between each anode 4 and cathode 6 in the electrode stack 2.

In a subsequent second step B, the cathodes 6 are conveyed in a single first (conveying) direction R1 from the first magazine 8 into a chamber 12 without using a gripper. In an analogous manner, the anodes 4 are conveyed in a single second (conveying) direction R2 from the second magazine 10 into the chamber 12 without using a gripper. In this context, the cathodes 6 and the anodes 4 are stacked alternatingly in the chamber 12, whereby, first of all, one of the cathodes 6 is conveyed into the chamber 12. In step B, the first direction R1 and the second direction R2 run in a shared plane that is perpendicular to the chamber bottom 14.

Here, in a third step C, the cathodes 6 conveyed into the chamber 12 and the anodes 4 conveyed into the chamber 12 are pressed against a chamber bottom 14 of the chamber 12 by an air stream L, so that the sinking rate of the anodes 4 and of the cathodes 6 towards the chamber bottom 12 is increased.

In a fourth step D, the alternatingly stacked cathodes 6 and anodes 4 are aligned in the chamber 12 so as to be flush and then pressed against each other in a fifth step E. The electrode stack 2 formed in this manner is provided for the production of the lithium-ion battery in a sixth step F.

Figure 2A:
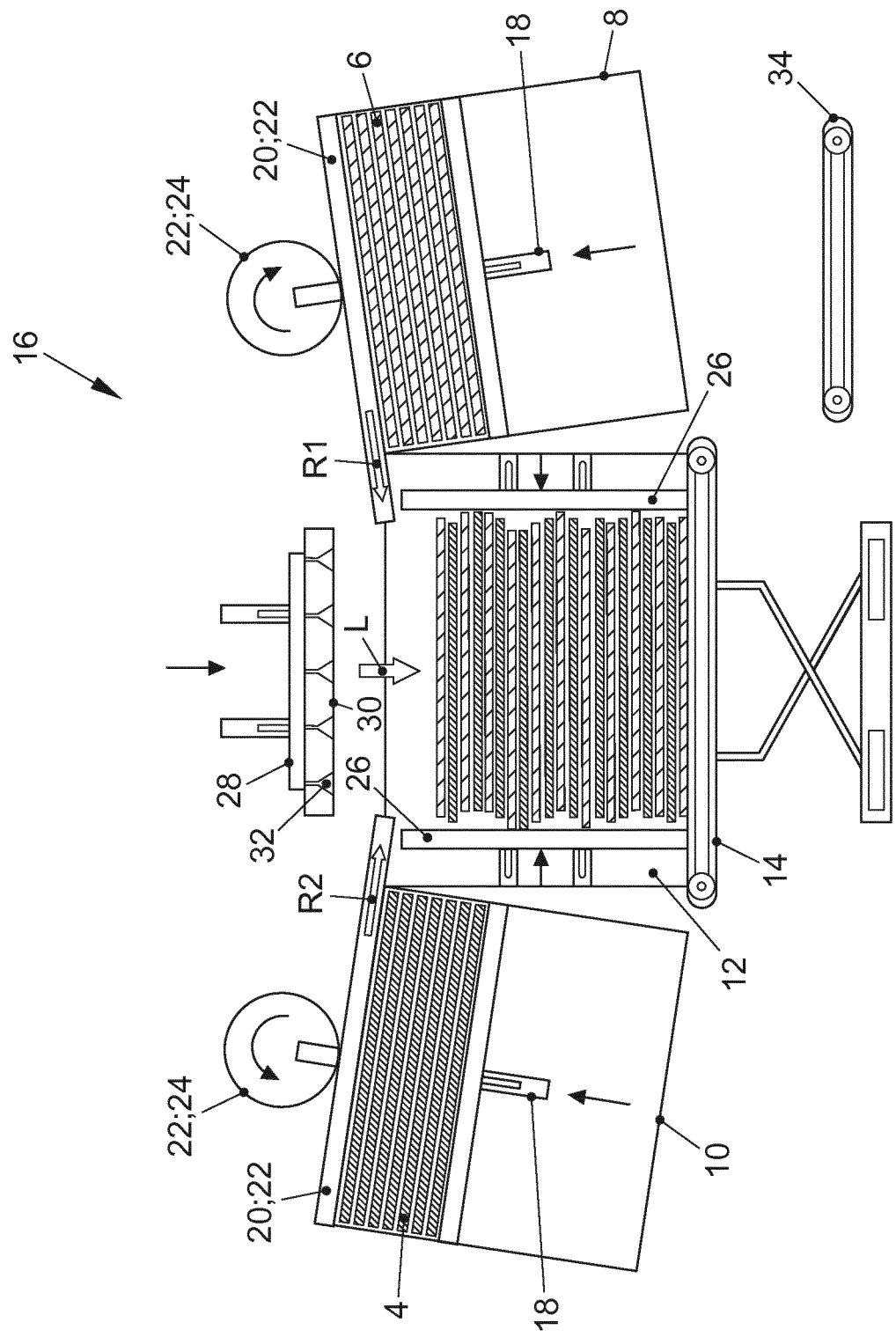
FIG. 2a is a schematic front view of an apparatus for producing an electrode stack, whereby the apparatus has a conveying device with conveying rollers that are driven exclusively so as to rotate, in order to convey anodes and cathodes into a chamber of the apparatus, and whereby the apparatus has a ram to align the cathodes and anodes so as to be flush with each other.
Figure 2B:
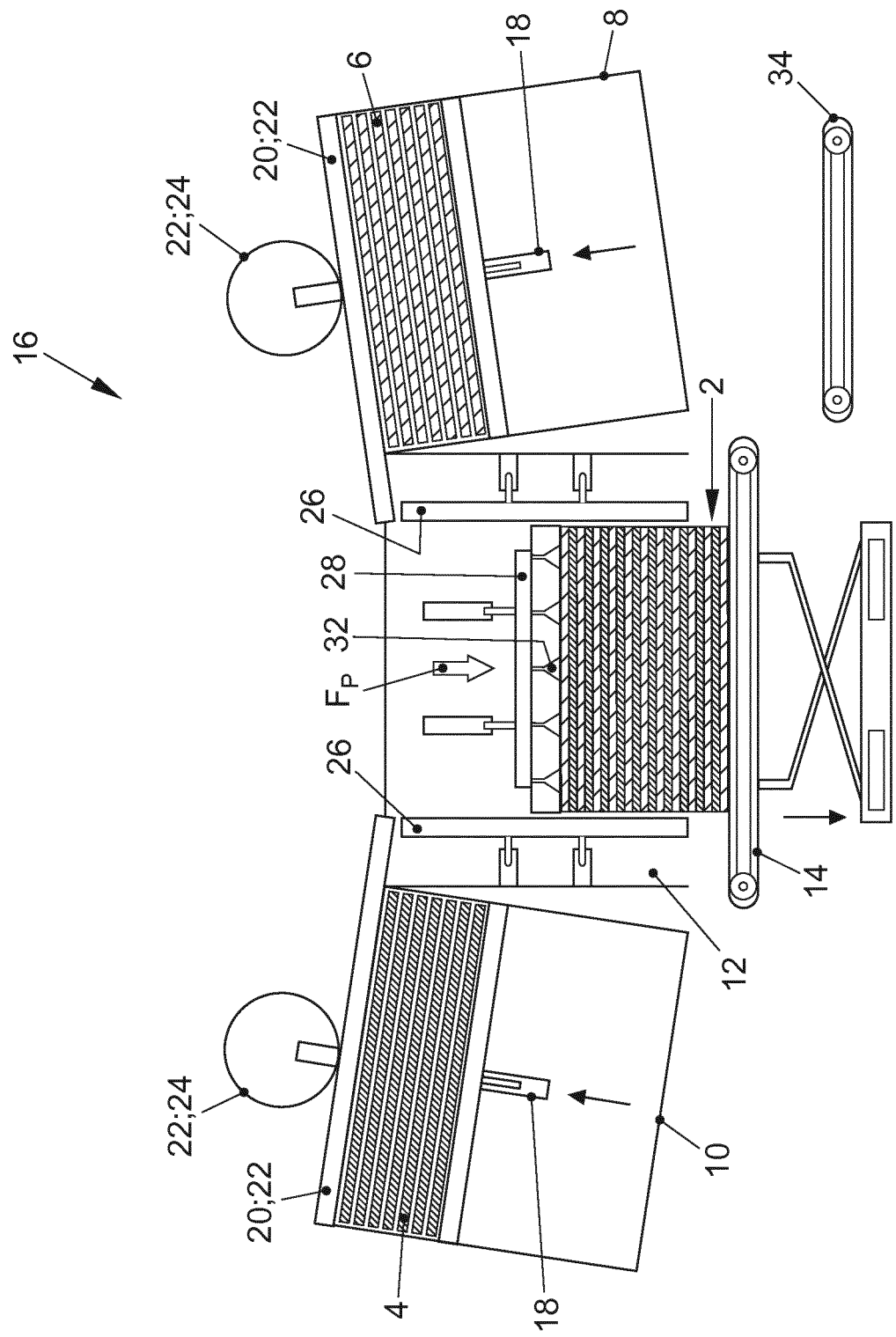
FIG. 2b is a schematic front view of the apparatus, whereby the chamber bottom is formed by a conveyor belt, especially one whose height is adjustable, and by means of which the electrode stack can be conveyed.
Figure 3:
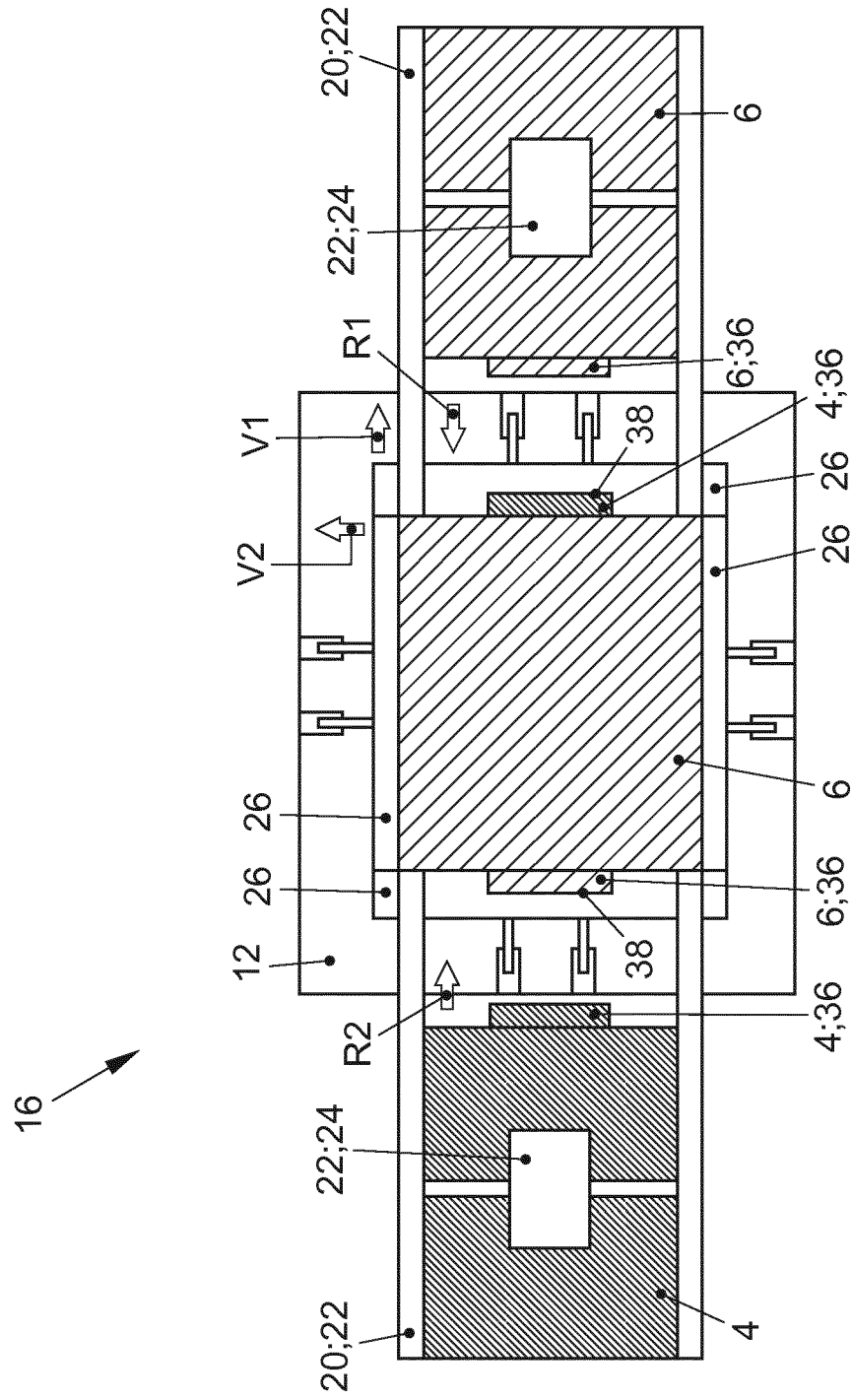
FIG. 3 is a schematic top view of the apparatus, whereby electrical contacts of the anodes and cathodes are accommodated in recesses of the rams.

FIGS. 2a, 2b and 3 schematically show an apparatus 16 for producing the electrode stack 2, especially as shown in the method depicted in FIG. 1.

The apparatus 16 comprises the first magazine 8 and the second magazine 10 in which the cathodes 6 or anodes 4 are provided for the production of the electrode stack 2. Here, the two magazines 8 and 10 each have a lifting unit 18 by means of which the cathodes 6 or anodes 4 that remain in the respective magazine 8 or 10 when one of the cathodes 6 or anodes 4 is removed can be shifted towards the guiderails 20 of a conveying means 22.

Moreover, the conveying means 22 has two conveying rollers 24 configured as cylinders which are each arranged between the guiderails 20 and whose rotational direction is indicated by an arrow. In this context, the conveying rollers 24 are locally stationary, in other words, they cannot be moved translationally, and are driven exclusively so as to rotate. The conveying rollers 24 have means (not shown in greater detail here) which are configured, for instance, as air channels connected to a vacuum pump or to an air suction pump with which a negative pressure can be generated.

When the conveying rollers 24 rotate, the uppermost anode 4 or cathode 6—in other words, the one facing the conveying means 22—contained in the magazine 10 or 8, respectively, is individuated from the anode 4 or cathode 6 stored in the appertaining magazine by means of the negative pressure and accelerated in the respective conveying direction R2 or R1. In this process, the guiderails 20 prevent an undefined deviation of the cathodes 6 or anodes 4 from their conveying direction R1 or R2 while they are being conveyed. In summary, the guiderails 20 serve to guide the conveyed anodes 4 and cathodes 6.

Furthermore, the apparatus 16 comprises the chamber 12 with the chamber bottom 14 into which the conveyed anodes 4 and cathodes 6 are placed alternatingly. As is shown in FIG. 2a, after the anodes 4 and cathodes 6 have been accommodated in the chamber 12, they are arranged in an undefined manner with respect to each other, that is to say, they are not flush relative to a direction that is perpendicular to the chamber bottom 14.

The apparatus 16 also has four rams 26, whereby, for the sake of greater clarity, only two are shown in FIGS. 2a, 2b. In this context, the rams 26 can be moved parallel to the chamber bottom 14. Two of the rams 26, which are situated opposite from each other, can also be moved in and counter to a first direction of movement V1, while the other two rams 26 can be moved in and counter to a second direction of movement V2 that is oriented perpendicular to the first direction of movement V1. In order to align the cathodes 6 and the anodes 4 so as to be flush with each other, the rams 26 are moved towards each other, as can be clearly seen in FIG. 3. In this process, the first direction of movement V1 runs in or parallel to the plane in which the first conveying direction R1 and the second conveying direction R2 run.

The apparatus 16 comprises a compression unit 28. On the side 30 facing the chamber bottom 14, the compression unit 28 has a plurality of air nozzles 32 that can generate an air stream L that is directed at the chamber bottom 14. The air stream L presses the anodes 4 and cathodes 6 that had been conveyed into the chamber 12 towards the chamber bottom 14, so that their sinking rate towards the chamber bottom 14 is increased.

The aligned anodes 4 and cathodes 6 are pressed against each other by the compression unit 28. For this purpose, the compression unit 28 is moved perpendicular to the chamber bottom 14 into the chamber 12, where it exerts a pressing force $F_P$ onto the anodes 4 and cathodes 6.

The chamber bottom 14 is formed by a conveyor belt whose height is adjustable. Subsequently, the electrode stack 2 consisting of anodes 4 and cathodes 6 that have been pressed against each other can be moved away from the rams 26 by lowering the chamber bottom 14 which is configured as a conveyor belt whose height is adjustable. In this context, the lowering of the chamber bottom 14 is indicated by an arrow. The electrode stack 2 is conveyed onto a transport belt 34 by means of the lowered conveyor belt. The transport belt 34 serves to transport the electrode stack 2 to a storage place and/or to another apparatus for producing the lithium-ion battery.

Each of the anodes 4 and each of the cathodes 6 has an electrical contact 36 which is formed by means of a current conductor of the electrode 4 or 6, respectively. In this context, the contact 36 projects beyond an end face of the appertaining electrode 4 or 6. For the sake of greater clarity, the electrical contacts 36 are not depicted in FIG. 2a and FIG. 2b. As can be seen in FIG. 3, the electrical contacts of the anodes 4 and cathodes 6 are arranged on opposite sides of the electrode stack 2 that run parallel to each other. Accordingly, two rams 26, which are situated opposite from each other each, have a recess 38, whereby one of the recesses 38 serves to accommodate the electrical contacts 36 of the anodes 4 while the other recess 38 serves to accommodate the electrical contacts 36 of the cathodes 6.

The invention is not limited to the embodiments described above. On the contrary, other variants of the invention can be derived by the person skilled in the art without departing from the subject matter of the invention. In particular, all of the individual features described in conjunction with the embodiments can also be combined with each other in any desired manner without departing from the subject matter of the invention.

R2 second direction
V1 first direction of movement
V2 second direction of movement

LIST OF REFERENCE NUMERALS 2 electrode stack
4 anode
6 cathode
8 first magazine
10 second magazine
12 chamber
14 chamber bottom
16 apparatus
18 lifting unit
20 guiderails
22 conveying means
24 conveying roller
26 ram
28 compression unit
30 side
32 air nozzle
34 transport belt
36 electrical contact
38 recess
A "providing" method step
B "conveying" method step
C "pushing" method step
D "aligning" method step
E "pressing" method step
F "providing" method step
$F_P$ pressing force
L air stream
R1 first direction

The invention claimed is:

1. An apparatus for producing an electrode stack consisting of anodes and cathodes adapted for a lithium-ion battery of an electrically powered motor vehicle, said apparatus comprising:
 a chamber configured to accommodate the anodes and the cathodes;
 a conveying device without a gripper configured to transfer the anodes and the cathodes from respective magazines into the chamber;
 at least two rams arranged in the chamber, each of said rams being configured to move parallel to a bottom of the chamber and perpendicular to a direction of movement of the other ram, so that the anodes and the cathodes are aligned and so that the anodes and the cathodes are flush with each other while being held in the chamber; and
 a compression unit configured to move perpendicular to the chamber bottom to generate a pressing force onto the anodes and the cathodes while the anodes and cathodes are alternatingly stacked and aligned so that the anodes and the cathodes are flush with each other in the chamber;
 wherein the conveying device further comprises a conveying roller configured to drive and rotate while transferring the anodes and the cathodes.

2. The apparatus according to claim 1, wherein the at least two rams comprises four rams arranged in the chamber, wherein two of the four rams are configured to move in a first direction, and wherein two other of the four rams are configured to move in a second direction that is perpendicular to the first direction.

3. The apparatus according to claim 1, wherein the compression unit further comprises an air nozzle on its a side facing the chamber bottom, said air nozzle being configured to generate an air stream towards the chamber bottom.

4. The apparatus according to claim 1, wherein one of the at least two rams includes a recess configured to accommodate a plurality of electrical contacts of the cathodes and of the anodes.

5. The apparatus according to claim 1, wherein the conveying roller further comprises a roller element configured to generate a negative pressure adapted for transferring the anodes and the cathodes from the respective magazines into the chamber.

6. The apparatus according to claim 1, wherein the chamber bottom comprises a conveyor belt, wherein the conveyor belt is configured to adjust in height.

\* \* \* \* \*